US011943615B2

(12) United States Patent
Lee et al.

(10) Patent No.: US 11,943,615 B2
(45) Date of Patent: *Mar. 26, 2024

(54) METHOD AND APPARATUS FOR DISCUSSING DIGITAL CERTIFICATE BY ESIM TERMINAL AND SERVER (71) Applicant: Samsung Electronics Co., Ltd., Gyeonggi-do (KR)

(72) Inventors: Hyewon Lee, Seoul (KR); Duckey Lee, Seoul (KR); Sujung Kang, Gyeonggi-do (KR); Youngsun Ryu, Gyeonggi-do (KR); Jonghan Park, Gyeonggi-do (KR); Kangjin Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,830

(22) Filed: Nov. 18, 2021

(65) Prior Publication Data
US 2022/0078616 A1  Mar. 10, 2022

Related U.S. Application Data (63) Continuation of application No. 16/622,009, filed as application No. PCT/KR2018/007244 on Jun. 26, 2018, now Pat. No. 11,184,769.

(30) Foreign Application Priority Data

Jul. 4, 2017 (KR) .................. 10-2017-0084794

(51) Int. Cl.
*H04W 12/069* (2021.01)
*H04W 12/043* (2021.01)
(Continued)

(52) U.S. Cl.
CPC ....... *H04W 12/069* (2021.01); *H04W 12/043* (2021.01); *H04W 12/35* (2021.01); *H04W 12/72* (2021.01)

(58) Field of Classification Search
CPC ... H04W 12/069; H04W 12/72; H04W 12/35; H04W 12/043
(Continued)

(56) References Cited

U.S. PATENT DOCUMENTS 6,304,974 B1 * 10/2001 Samar ................... H04L 9/3263
380/282
8,516,269 B1    8/2013 Hamlet
(Continued)

FOREIGN PATENT DOCUMENTS

CN    106357711 A  *  1/2017
CN    109428717       3/2019
(Continued)

OTHER PUBLICATIONS

Martinez-Pelaez et al., "Efficient Certificate Path Validation and Its Application in Mobile Payment Protocols," 2008 Third International Conference on Availability, Reliability and Security, 2008, pp. 701-708, doi: 10.1109/ARES.2008. (Year: 2008).*
(Continued)

*Primary Examiner* — Peter C Shaw
(74) *Attorney, Agent, or Firm* — The Farrell Law Firm, P.C.

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated (Continued)

with security and safety) on the basis of 5G communication technology and IoT-related technology. Disclosed are a method and an apparatus for securely providing a profile to a terminal in a communication system.

18 Claims, 7 Drawing Sheets

(51) Int. Cl.
*H04W 12/30* (2021.01)
*H04W 12/72* (2021.01)

(58) Field of Classification Search
USPC .................................................. 726/2
See application file for complete search history.

(56) References Cited

U.S. PATENT DOCUMENTS

| | | | |
|---|---|---|---|
| 8,954,742 | B2 | 2/2015 | Moreira |
| 9,009,475 | B2 | 4/2015 | Hauck et al. |
| 9,831,903 | B1* | 11/2017 | Narasimhan ........ H04M 17/103 |
| 2004/0253943 | A1 | 12/2004 | Suzuki |
| 2005/0086467 | A1 | 4/2005 | Asokan |
| 2007/0198831 | A1 | 8/2007 | Suzuki et al. |
| 2007/0288745 | A1 | 12/2007 | Kwan et al. |
| 2008/0003980 | A1 | 1/2008 | Voss |
| 2009/0019284 | A1 | 1/2009 | Cho et al. |
| 2009/0070582 | A1 | 3/2009 | Aura et al. |
| 2009/0209232 | A1 | 8/2009 | Cha et al. |
| 2010/0088518 | A1 | 4/2010 | Dottax |
| 2012/0151554 | A1 | 6/2012 | Tie |
| 2012/0159105 | A1 | 6/2012 | von Behren |
| 2012/0278614 | A1 | 11/2012 | Choi |
| 2013/0246281 | A1 | 9/2013 | Yamada |
| 2013/0346745 | A1 | 12/2013 | Broch |
| 2014/0082359 | A1* | 3/2014 | Nakhjiri ................ H04L 9/3066 713/168 |
| 2014/0329502 | A1 | 11/2014 | Lee et al. |
| 2014/0365781 | A1 | 12/2014 | Dmitrienko |
| 2016/0283216 | A1 | 9/2016 | Gao |
| 2016/0301529 | A1 | 10/2016 | Park et al. |
| 2016/0316355 | A1* | 10/2016 | Brooks ................. H04W 12/08 |
| 2017/0086058 | A1* | 3/2017 | Jolivet .................. H04W 8/183 |
| 2018/0007557 | A1 | 1/2018 | Lee |
| 2018/0027405 | A1 | 1/2018 | Holtmanns |
| 2018/0294949 | A1 | 10/2018 | Yang |
| 2019/0230087 | A1 | 7/2019 | Gharout |
| 2019/0394053 | A1 | 12/2019 | Yu |
| 2020/0036704 | A1* | 1/2020 | Chu ...................... H04W 12/06 |

FOREIGN PATENT DOCUMENTS

| | | | | |
|---|---|---|---|---|
| EP | | 3059923 A1 * | 8/2016 | ............. H04L 63/08 |
| JP | | 2014500678 A * | 1/2014 | ............. H04W 6/20 |
| JP | | 6967211 B1 * | 11/2021 | |
| WO | WO-2004017560 A1 * | 2/2004 | ......... H04L 63/0428 |
| WO | WO-2011137763 A2 * | 11/2011 | ............. G06F 16/20 |
| WO | WO-2013189245 A1 * | 12/2013 | ............. H04L 67/02 |
| WO | WO-2015082852 A1 * | 6/2015 | ............. H04W 8/183 |

OTHER PUBLICATIONS

Shareef et al., "Implementing a Distributed Certificate Authority Using Elliptic Curve Cryptography for Big Data Environment," 2020 2nd Annual International Conference on Information and Sciences (AiCIS), 2020, pp. 132-140, doi: 10.1109/AiCIS51645. 2020.00031. (Year: 2020).*

Vesselkov et al., "Value networks of embedded SIM-based remote subscription management," 2015 Conference of Telecommunication, Media and Internet Techno-Economics (CTTE), Munich, Germany, 2015, pp. 1-7, doi: 10.1109/CTTE.2015.7347220 (Year: 2015).*

Ahmed et al., "Security Analysis of the Consumer Remote SIM Provisioning Protocol", arXiv:2211.15323v1, Nov. 28, 2022 (Year: 2022).*

Park et al., "Secure Profile Provisioning Architecture for Embedded UICC," 2013 International Conference on Availability, Reliability and Security, Regensburg, Germany, 2013, pp. 297-303, doi: 10.1109/ ARES.2013.40. (Year: 2013).*

Park et al., "The Aegis: UICC-Based Security Framework," 2008 Second International Conference on Future Generation Communication and Networking, Hainan, China, 2008, pp. 264-269, doi: 10.1109/FGCN.2008.91. (Year: 2008).*

Mousa et al., "Utilizing the eSIM for Public Key Cryptography: a Network Security Solution for 6G," 2020 2nd International Conference on Computer and Information Sciences (ICCIS), Sakaka, Saudi Arabia, 2020, pp. 1-6, doi: 10.1109/ICCIS49240.2020. 9257601. (Year: 2020).*

Ahamad et al., "Enhanced Mobile SET Protocol with Formal Verification", IEEE, doi: 10.1109/ICCCT.2012.65, 2012, pp. 288-293. (Year: 2012).

Park et al., "Secure Profile Provisioning Architecture for Embedded UICC", doi: 10.1109/ARES.2013.40, 2013, pp. 297-303, (Year: 2013).

PCT/ISA/210 Search Report issued on PCT/KR2018/007244, pp. 7.
PCT/ISA/237 Written Opinion issued on PCT/KR2018/007244, pp. 6.

Gsm Association: Remote Provisioning Architecture for Embedded UICC Technical Specification Version 2.0, XP-055262151, Oct. 13, 2014, 293 pages.

European Search Report dated Mar. 17, 2020 Issued in counterpart application No. 18828873.2-1213, 10 pages.

Dan Lu et al. "Analysis of Embedded SIM Remote Provisioning Technologies and Security Problems", Telecommunications Network Technology vol. 2016 Issue 2, Feb. 15, 2016, 7pgs.

Chinese Office Action dated Oct. 11, 2021 issued in counterpart application No. 201880045001.4, 18 pages.

EP Intention to Grant dated Oct. 6, 2023 issued in counterpart application No. 18828873.2-1213, 48 pages.

* cited by examiner

METHOD AND APPARATUS FOR DISCUSSING DIGITAL CERTIFICATE BY ESIM TERMINAL AND SERVER

PRIORITY

This application is Continuation application of U.S. patent application Ser. No. 16/622,009, filed with the U.S. Patent and Trademark Office on Dec. 12, 2019, as a National Phase Entry of PCI International Application No. PCT/KR2018/007244 which was filed on Jun. 26, 2018, and claims priority to Korean Patent Application No. 10-2017-0084794, which was filed on Jul. 4, 2017, the content of each of which is incorporated herein by reference.

BACKGROUND

1. Field

The disclosure relates to a method and an apparatus for downloading and installing communication services by, a terminal, thereby establishing a communication connection in a communication system. The disclosure also relates to a method and an apparatus for downloading, installing, and managing a profile online in a communication system.

2. Related Art

In order to meet wireless data traffic demands that have increased after 4G communication system commercialization, efforts to develop an improved 5G communication system or a pre-5G communication system have been made. For this reason, the 5G-communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna, are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (COMP), and received interference cancellation to improve the system network.

In addition, the 5G system has developed Advanced Coding Modulation (ACM) schemes such as Hybrid FSK and QAM Modulation (FOAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information, An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, technologies, such as a sensor network, machine-to-machine (M2M) communication, machine type communication (MTC), and the like, are being implemented by 5G communication techniques such as beamforming, MIMO, array antennas, and the like. The application of a cloud RAN as the big data processing technology may be an example of convergence of the 5G technology and the IoT technology.

A universal integrated circuit card (UICC) is a smart, card that is inserted into a mobile terminal and the like for use and is also called a "WC". The UICC may include an access control module for accessing a mobile communication provider's network. Examples of the access control module include a universal subscriber identity module (USDA), a subscriber identity module (SIM), an IP multimedia service identity module (ISIM), and the like. A UICC including a USIM is commonly called a "USIM card", Likewise, a UICC; including a SIM module is commonly called a "SIM card". In the following description of the disclosure, a SIM card will be used as a typical meaning encompassing a UICC, a USIM card, a UICC including an ISM, and the like. That is, although a description is made of the SIM card, techniques thereof may be equally applied to a USIM card, an ISIM card, or a general UICC.

The SIM card stores personal information of a mobile communication subscriber and performs subscriber authentication and producing a traffic security key when accessing a mobile communication network, thereby enabling secure usage of mobile communication.

At the time of proposing the disclosure, the SIM card is generally manufactured as a dedicated card to a specific mobile communication provider at the request of the corresponding provider when manufacturing the card, and authentication information of the corresponding provider for network access, such as a universal subscriber identity module (USIM) application, an international mobile subscriber identity (IMSI), a K value, an ON; value, and the like, are prerecorded in the card to then be provided. Therefore, the manufactured SIM card is supplied to the corresponding mobile communication provider, and the mobile communication provider provides the SIM card to the subscriber. Thereafter, if necessary, it is possible to perform management of installation, modification, and deletion of an application with respect to the UICC using technology such as over-the-air (OTA) or the like. The subscriber may insert the UICC into a mobile terminal owned by the subscriber, thereby using the network and application services of the corresponding mobile communication provider. When replacing the terminal, the subscriber may take out the UICC from the existing terminal and insert the same into a new terminal, thereby using authentication information, a mobile phone number, personal phone books, and the like without any change.

However, the SIM card is inconvenient for the user of the mobile terminal when receiving services from other mobile communication providers. The user of the mobile terminal must physically acquire a SIM card in order to receive services from a mobile communication provider. For example, if the user travels to another country, the user must acquire a local SIM card in order to receive local mobile communication services. Although a roaming service solves the above inconvenience to some extent, a service charge of the roaming service is very high, and the roaming service requires a separate contract between the mobile communication providers.

Meanwhile, if a SIM module is able to be remotely downloaded and installed in the UICC, most of the inconveniences may be eliminated. That is, the user may download, to the UICC, a SIM module of the mobile communication services to be used at the time desired by the user. In addition, the UICC may download and install a plurality of SIM modules, and may select and use only one of the SLM modules. The UICC may or may not be fixed to the terminal. In particular, a UICC fixed to a terminal is called an "embedded UICC (eUICC)". Typically, the eUICC denotes a UICC that is fixed to a terminal and may select a SIM module by remotely downloading the same. In the disclosure, a UICC capable of remotely downloading and selecting the SIM module will be collectively referred to as an "eUICC". That is, among the UICCs capable of remotely downloading and selecting the SIM module, the UICC that is or is not fixed to the terminal will be collectively referred to as an "eUICC". In addition. SIM module information to be downloaded will collectively referred to as an "eUICC profile".

SUMMARY

An aspect of the disclosure provides a method and an apparatus in which a terminal selects a communication service for a communication connection in a communication system. Another aspect of the disclosure is to provide a method and an apparatus in which a terminal downloads, installs, and manages a profile for a communication connection online in a communication system. Another aspect of the disclosure is to provide an apparatus and a method for safely providing a profile to a terminal in a communication system.

In particular, the disclosure proposes the following solutions for the above purposes.

A method for transmitting digital certificate issuer information trusted by a terminal to a profile management server (SM-DP+)

A method in which the profile management server (SM-DP+) transmits a digital certificate corresponding to the above information to a terminal in reply A message exchange procedure between the terminal and the profile management server (SM-DP+).

In order to solve the above problems, provided is a method performed by a terminal including a universal integrated circuit card (UICC) in a wireless communication system, the method comprising: obtaining a certificate issuer (CI) public key identifier; obtaining, from the UICC information including a list of public key identifiers supported by the UICC; in case that a public key identifier for an authentication is restricted to the CI public key identifier, modifying the list by removing at least one public key identifier not matched with the CI public key identifier from the list of the public key identifiers supported by the UICC; and transmitting, to a server, a message for initiating the authentication, the message including the modified list.

According to a further aspect of the present disclosure, provided is a terminal in a wireless communication system, the terminal comprising: a transceiver configured to transmit and receive a signal; a universal integrated circuit card (UICC); and a controller coupled with the transceiver and configured to: obtain a certificate issuer (CI) public key identifier, obtain, from the UICC, UICC information including a list of public key identifiers supported by the UICC, in case that a public key identifier for an authentication is restricted to the CI public key identifier, modify the list by removing at least one public key identifier not matched with the CI public key identifier from the list of the public key identifiers supported by the UICC, and transmit, to a server, a message for initiating the authentication, the message including the modified list.

According to another aspect of the present disclosure, provided is a method performed by a server in a wireless communication system, the method comprising: receiving, from a terminal, a first message for initiating an authentication of the terminal, the first message including a modified list of public key identifiers matched with a first certificate issuer (CI) public key identifier; and transmitting, to the terminal, a second message in response to the first message, the second message including a second CI public key identifier to be used by a universal integrated circuit card (UICC) of the terminal, wherein the first CI public key identifier is pre-obtained by the terminal, and wherein the modified list is modified by the terminal by removing at least one public key identifier not matched with the first CI public key identifier from a list of the public key identifiers supported by the UICC of the terminal, in case that a public key identifier for an authentication is restricted to the first CI public key identifier, the list of the public key identifiers being included in UICC information cached in the terminal.

According to a further aspect of the present disclosure, provided is a server in a wireless communication system, the server comprising: a transceiver configured to transmit and receive a signal; and a controller coupled with the transceiver and configured to: receive, from a terminal, a first message for initiating an authentication of the terminal, the first message including a modified list of public key identifiers matched with a first certificate issuer (CI) public key identifier, and transmit, to the terminal, a second message in response to the first message, the second message including a second CI public key identifier to be used by a universal integrated circuit card (UICC) of the terminal, wherein the first CI public key identifier is pre-obtained by the terminal, wherein the modified list is modified by the terminal by removing at least one public key identifier not matched with the first CI public key identifier from a list of the public key identifiers supported by the UICC of the terminal, in case that a public key identifier for an authentication is restricted to the first CI public key identifier, the list of the public key identifiers being included in UICC information cached in the terminal.

According to embodiments of the disclosure, the terminal can inform the profile management server (SM-DP+) of digital certificate issuer information trusted by the terminal, and can receive a digital certificate issued by a digital certificate issuer that the terminal trusts from the profile management server (SM-DP+) in a communication system. Accordingly, the terminal and the profile management server (SM-DP+) can reduce the security threat during a mutual authentication process using a digital certificate issued by a specific digital certificate issuer during the mutual authentication.

DETAILED DESCRIPTION

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The specific terms used herein are provided for ease of understanding the disclosure, and such specific terms may be changed into other forms without departing from the spirit and scope of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a. Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

First, terms used in this specification will be defined.

In this specification, a UICC is a smart card inserted and used in a mobile terminal and denotes a chip that stores personal information, such as network access authentication information of a mobile communication subscriber, phone books, and SMS, and performs subscriber authentication and traffic security key generation when accessing a mobile communication network, such as GSM, WCDMA, LTE, or the like, thereby enabling secure mobile communication usage. The UICC may be equipped with communication applications, such as a subscriber identification module (SIM), a universal SIM (USIM), IP multimedia SIM (ISM), or the like, according to the type of mobile communication network accessed by the subscriber, and may provide a higher level security function for employing various applications such as an electronic wallet, ticketing, an electronic passport, and the like.

In this specification, an embedded eUICC (eUICC) is a security module in the form of a chip embedded in a terminal, which cannot be inserted into and cannot be removed from the terminal. The eUICC may download and install a profile using over-the-air (OTA) technology. The eUICC may be referred to as a "UICC capable of downloading and installing a profile".

In this specification, a method of downloading and installing a profile in the eUICC using the OTA technology may also be applied to a detachable UICC that can be inserted into and removed from the terminal. That is, the embodiments of the disclosure may be applied to a UICC capable of downloading and installing a profile using the OTA technology.

In this specification, the term "UICC" may be used interchangeably with "SPX, and the term "eUICC" may be used interchangeably with "eSIM".

In this specification, a profile may denote a package of an application, a file system, an authentication key value, and the like, which are stored in the UICC, in a software form.

In this specification, a USIM Profile may have the same meaning as the profile, or may denote a package of information included in the USIM application in the profile in a software form.

In this specification, a profile provision server may have a function of producing a profile, encrypting the produced profile, producing a remote profile management instruction, or encrypting the produced remote profile management instruction, and may be referred to as a "subscription manager data preparation (SM-DP)", a "subscription manager data preparation plus (SM-DP+)", an "off-card entity of profile domain", a "profile encryption server", a "profile producing server", a "profile provisioner (PP)", a "profile provider", or a "profile provisioning credentials (PPC) holder".

In this specification, a profile management server may be referred to as a "subscription manager secure routing (SM-SR)", a "subscription manager secure routing plus (SM-SR-+)", an "off-card entity of eUICC profile manager", a "profile management credentials (PMC) holder", or an "eUICC manager (EM)".

In this specification, the profile provision server may encompass the functions of the profile management server. Therefore, in various embodiments of the disclosure, that is, in the following description, the operation of the profile provision server may also be performed by the profile management server. Likewise, the operation of the profile management server or the SM-SR may also be performed by the profile provision server.

The term "terminal" as used herein may be referred to as a "mobile station (MS)", "user equipment (UE)", a "user terminal (UT)", a "wireless terminal", an "access terminal (AT)", a "terminal", a "subscriber unit", a "subscriber station (SS)", a "wireless device", a "wireless communication device", a "wireless transmit/receive unit (WTRU)", a "mobile node", "mobile", or other terms. Various embodiments of the terminal may include a cellular phone, a smartphone having a wireless communication function, a personal digital assistant (PDA) having a wireless communication function, a wireless modem, a portable computer having a wireless communication function, a photographing device, such as a digital camera, leaving a wireless communication function, a gaming device having a wireless communication function, home appliances for music storage and playback having a wireless communication function, Internet home appliances capable of wireless Internet access and browsing, a portable unit employing combinations of the above functions, or terminals thereof. In addition, the terminal may include a machine-to-machine (M2M) terminal or a machine type communication (\ITC) terminal/device, but is not limited thereto. In this specification, the terminal may be referred to as an "electronic device".

In this specification, the electronic device may include an embedded UICC capable of downloading and installing a profile. In the case where the UICC is not embedded in the electronic device, a UICC physically separated from the electronic device may be inserted into the electronic device, thereby connecting to the electronic device. For example, the UICC in the form of a card may be inserted into the electronic device. The electronic device may include the terminal, and in this case, the terminal may be a terminal including a UICC capable of downloading and installing a profile. The UICC may be embedded in the terminal, and in the case where the terminal and the UICC are separate from each other, the UICC may be inserted into the terminal to then be connected to the terminal. The UICC capable of downloading and installing a profile may be called, for example, an "eUICC".

In this specification, the terminal or the electronic device may include software or an application installed in the terminal or the electronic device so as to control the UICC or the eUICC. The software or the application may, for example, be referred to as a "local profile assistant (LPA)".

In this specification, a profile identifier may be referred to as a "profile ID", an "integrated circuit card ID (ICCID)", a "matching ID", an "event identifier (H))", an "activation code", an "activation code token", or a "factor matching ISD-P or a profile domain (PD)". The profile ID may indicate a unique identifier of each profile. The profile identifier may include an address of a profile provision server (SM-DP+) capable of indexing profiles.

In this specification, an eUICC identifier (eUICC ID) may be a unique identifier of the eUICC embedded in the terminal, and may be referred to as an "EID". In addition, in the case where the eUICC, is equipped with a provisioning profile, the eUICC identifier may be a profile ID of the corresponding provisioning profile. In addition, in the case where the terminal and the eUICC chip are not separate as in the embodiment of the disclosure, the eUICC identifier may be a terminal ID. In addition, the eUICC identifier may denote a specific secure domain of the eUICC chip.

In this specification, a profile container may be referred to as a "profile domain". The profile container may be a security domain.

In this specification, an application protocol data unit (APDU) may be a message by which the terminal interworks with the eUICC. In addition, the APDU may be a message by which a PP or a PM interworks with the eUICC.

In this specification, profile provisioning credentials (PPC) may be a means used in mutual authentication, profile encryption, and signature between the profile provision server and the eUICC. The PPC may include at least one of a symmetric key, a Rivest Shamir Adleman (RSA) certificate and a private key, an elliptic curved cryptography (ECC) certificate and a private key, a root certification authority (CA), and a certificate chain. In addition, if there is a plurality of profile provision servers, different PPCs may be stored in the eUICC or used for the respective profile provision servers.

In this specification, profile management credentials (PMC) may be a means used in mutual authentication, transmission data encryption, and signature between the profile management server and the eUICC. The PMC may include at least one of a symmetric key, an RSA certificate and a private key, an ECC certificate and a private key, a root CA, and a certificate chain. In addition, if there is a plurality of profile management servers, different PMCs may be stored in the eUICC or used for the respective profile management servers.

In this specification, an AID may be an application identifier. This value may be an identifier for distinguishing between different applications in the eUICC.

In this specification, an event may denote profile download, remote profile management, or management/processing instructions of other profiles or the eUICC. "Profile download" may be used interchangeably with "profile installation", In addition, an event type may be used to indicate whether a specific event is profile download, remote profile management, or a management/processing command of other profiles or the eUICC, and may be referred to as an "operation type (or operationtype)", an "operation class (or operationclass)", an "event request type", an "event class", an "event request class", or the like.

In this specification, a "profile package" may be used interchangeably with a "profile", or may be used as a term indicating a data object of a specific profile, and may be referred to as a "profile TIN" or a "profile package TLV". In the case where a profile package is encrypted using encryption parameters, the profile package may be referred to as a "protected profile package (PPP)" or a "protected profile package TLV (PPP TLV)". In the case where a profile package is encrypted using encryption parameters that can be decrypted only by a specific eUICC, the profile package may be referred to as a "bound profile package (BPP)" or a "bound profile package TLV (BPP TLV)". The profile package TLV may be a data set representing information constituting the profile in a TLV (tag, length, and value) format.

In this specification, remote profile management (RPM) may be referred to as "remote profile management", "remote management", a "remote management command", a "remote command", a "remote profile management (RPM) package", a "remote profile management package", a "remote management package", a "remote management command package", or a "remote command package". The RPM may be used to change the status of a specific profile (enabled, disabled, or deleted) or update the content of a specific profile (e.g., a profile nickname, profile metadata, or the like). The RPM may include one or more remote management commands, and in this case, the profiles, which are targets of the respective remote management commands, may be the same or different depending on the remote management commands.

In this specification, a certificate or a digital certificate may denote a digital certificate used for mutual authentication based on an asymmetric key including a pair of a public key (PK) and a secret key (SK). Each certificate may include one or more public keys (PKs), public key identifiers (PK IDs) corresponding to the respective public keys, an identifier of a certificate issuer (CI) who issued the certificate (a certificate issuer ID), and a digital signature thereof. In addition, the certificate issuer may be referred to as a "certification issuer", a "certificate authority (CA)", a "certification authority", or the like. In this specification, the public key (PK) and the public key ID (PK ID) may denote a specific public key or a certificate containing the corresponding public key, a portion of a specific public key or a portion of a certificate containing the corresponding public key, an operation result value of a specific public key (e.g., hash) or an operation result value of a certificate containing the corresponding public key (e.g., hash), an operation result value of a portion of a specific public key hash) or an operation result value of a portion of a certificate containing the corresponding public key (e.g., hash), or a storage space storing the above data, and may be used interchangeably therewith.

In this specification, if certificates issued by a single certificate issuer (primary certificates) are used to issue other certificates (secondary certificates), or if the secondary certificates are successively used to issue third or more certificates, the correlation of the certificates may be referred to as a "certificate chain" or a "certificate hierarchy". In this case, the CI certificate used in initial certificate issuance may be referred to as a "root of certificate", a "highest certificate", a "root CI", a "root CI certificate, a "root CA", a "root CA certificate", or the like.

In this specification, AKA may indicate authentication and key agreement, and may represent an authentication algorithm for accessing 3GPP and 3GPP2 networks.

In this specification, "K" is an encryption key value stored in the eUICC, which is used in the AKA authentication algorithm.

In this specification, "OPc" is a parameter value that may be stored in the eUICC, which is used in the AKA authentication algorithm.

In this specification, an "NAA" is a network access application, and may be an application program such as USLM or ISM stored in the UICC and accessing a network. The NAA may be a network access module.

In describing the disclosure, a detailed description of related known functions or configurations, which may unnecessarily obscure the subject matter of the disclosure, will be omitted.

Figure 1:
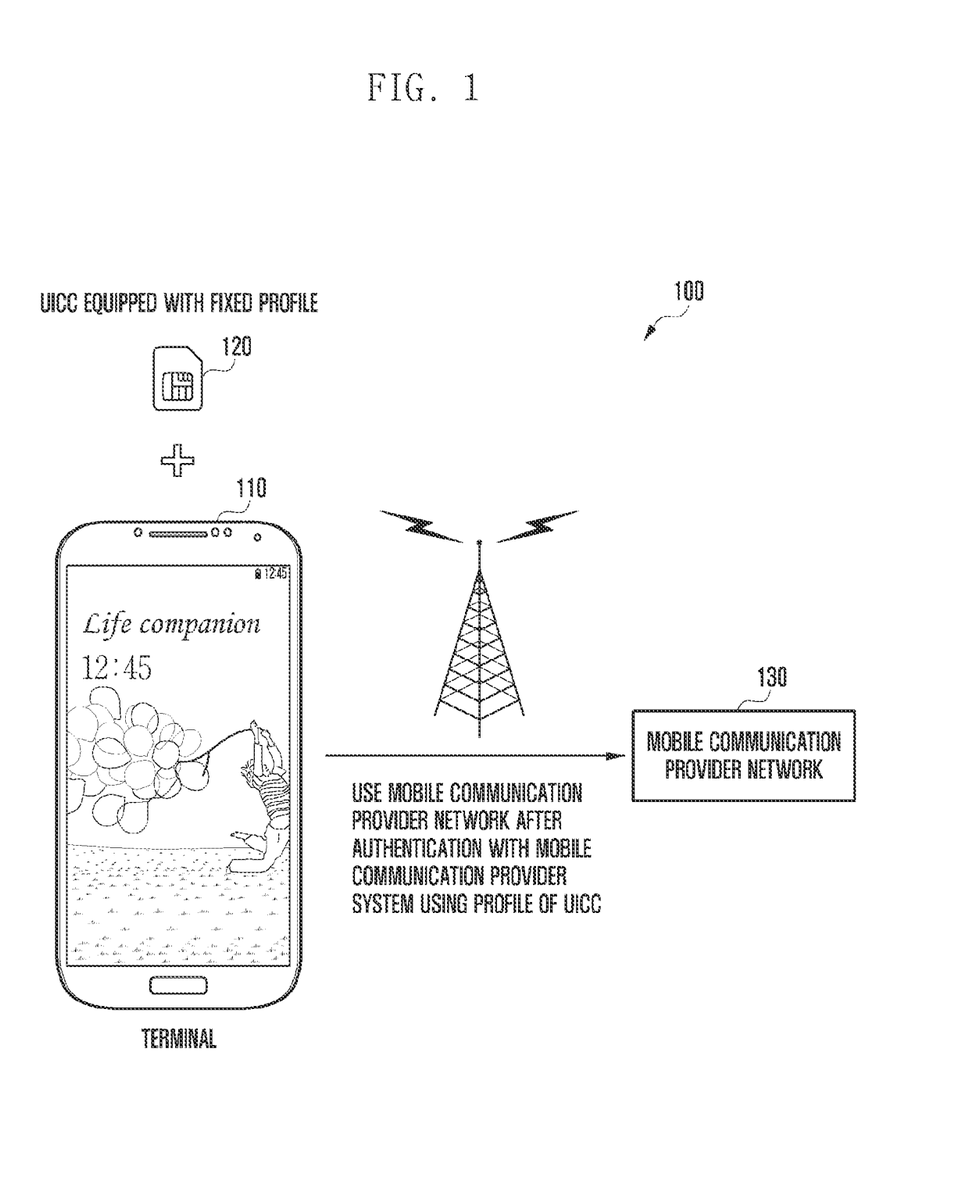
FIG. 1 is a diagram illustrating a method in which a terminal connects to a mobile communication network using a UICC equipped with a fixed profile.

FIG. 1 is a diagram 100 illustrating a method of connecting a terminal to a mobile communication network using a UICC equipped with a profile fixed to the terminal.

Referring to FIG. 1, a UICC 120 may be inserted into a terminal 110. In this case, the UICC may be detachable, or may be embedded in the terminal. The fixed profile of the UICC equipped with the fixed profile denotes that "access information" for accessing a specific communication provider is fixed. The access information may be, for example, an MST, which is a subscriber identifier, and a value "K" or "Ki" necessary for authentication in access to the network together with the subscriber identifier.

Then, the terminal may perform authentication with an authentication processing system {e.g., a home location register (HLR) or AuC) of a mobile communication provider using the UICC. The authentication process may be an authentication and key agreement (AKA) process. If authentication is successful, the terminal may use mobile communication services, such as a phone call or usage of mobile data using the mobile communication network 130 of the mobile communication system.

Figure 2:
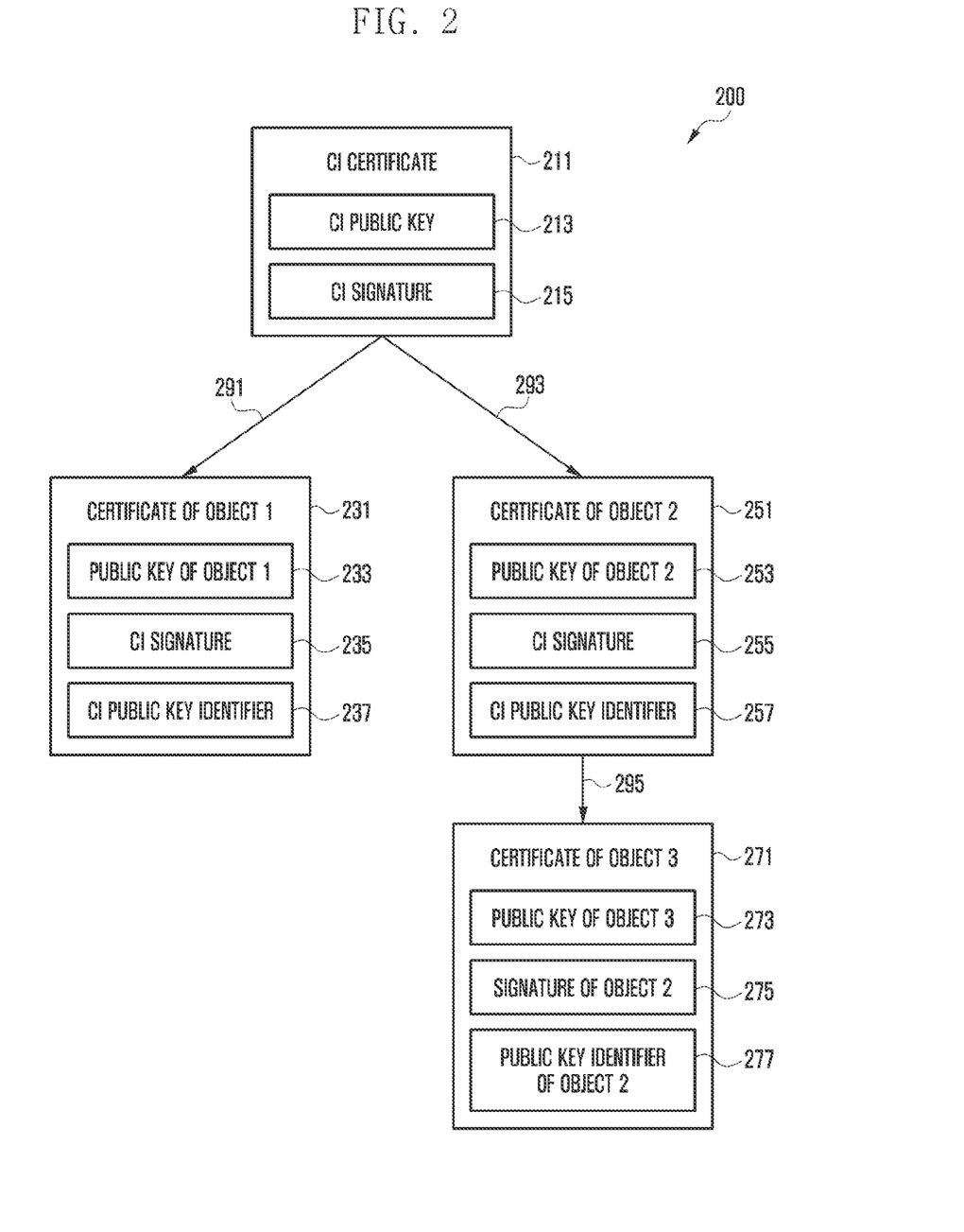
FIG. 2 is a diagram illustrating an example of a certificate hierarchy for certificates issued by a specific certificate issuer.

FIG. 2 is a diagram 200 illustrating an example of a hierarchy of certificate (or a certificate chain) issued by a certificate issuer (CI) and an example of configuration of a public key and a digital signature of a certificate issuer (CI), which are included in each certificate.

Referring to FIG. 2, the certificate issuer (CI) may produce a public key and a secret key to be used by the certificate issuer, may produce a certificate issuer (CI) certificate 211 by including the public key 213, among the above keys, in its own certificate, and may attach, to the certificate, a digital signature 215 produced using its own secret key with respect to the certificate.

In addition, referring to FIG. 2, the CI certificate 211 may be used to issue a certificate 231 of Object 1 (see 291). Object 1 may be, for example, a profile management server (SM-DP+). Object 1 may produce a public key and a secret key to be used by itself, may produce a certificate 231 of Object 1 by including the public key 233, among the keys, in its own certificate, and may make a request to the certificate issuer, thereby receiving certificate issuer (CI) digital signature 235 using the certificate issuer (CI) secret key. In this case, the certificate 231 of Object 1 may include a certificate issuer (CI) public key identifier (ID) (CI PKID) 237 corresponding to the certificate issuer (CI) public key 213, which is to be used when checking the certificate issuer signature 235 contained in the corresponding certificate.

In addition, referring to FIG. 2, the CI certificate 211 may be used to issue a certificate 251 of Object 2 (see 293). Object 2 may be, for example, an eUICC manufacturer (EUM). Object 2 may produce a public key and a secret key to be used by itself, may produce a certificate 251 of Object 2 by including the public key 253, among the above keys, in its own certificate, and may make a request to the certificate issuer, thereby receiving a certificate issuer (CI) digital signature 5 using the certificate issuer (CI) secret key. In this case, the certificate 251 of Object 2 may include a certificate issuer (CI) public key identifier (ID) (CI PKID) 237 corresponding to the certificate issuer (CI) public key 213, which is to be used when checking the certificate issuer signature 255 included in the corresponding certificate. The certificate issuer signatures 235 and 255 contained in the certificate 231 of Object 1 and the certificate 251 of Object 2 may have different values from each other, but the certificate issuer public key identifiers (CI PKIDs) 237 have the same value.

In addition, referring to FIG. 2, the certificate 251 of Object 2 may be used to issue a certificate 271 of Object 3 (see 295). Object 3 may be, for example, an eUICC manufactured by an eUICC manufacturer (EUM). Object 3 may produce a public key and a secret key to be used by itself, may produce a certificate 251 of Object 3 by including the public key 273, among the above keys, in its own certificate, and may make a request to Object 2, thereby receiving a digital signature 275 of Object 2 using the secret key of Object 2. In this case, the certificate 271 of Object 3 may include a public key identifier (ID) (CI PKID) 277 corresponding to the public key 253 of Object 2, which is to be used when checking the signature 275 of Object 2 contained in the corresponding certificate.

The certificate 231 of Object 1, the certificate 251 of Object 2, and the certificate 271 of Object 3 illustrated in the example of FIG. 2 all have the same CI certificate 211 as the highest certificate or the root of certificate. Therefore, Object 1, Object 2, and Object 3 require the CI certificate 211 or the CI public key 213 contained therein in order to authenticate each other. More specifically, in the example of FIG. 2, in order for Object 1 and Object 2 to authenticate each other using digital certificates and signatures, Object 1 requires the signature of Object 2, the certificate 251 of Object 2, and the CI public key 213, and Object 2 requires the signature of Object 1, the certificate 231 of Object 1, and the CI public key 213.

In addition, in the example of FIG. 2, in order for Object 1 and Object 3 to authenticate each other using digital certificates and signature, Object 1 requires the signature of Object 3, the certificate 271 of Object 3, the certificate 251 of Object 2, and the CI public key 213, and Object 3 requires the signature of Object 1, the certificate 231 of Object 1, and the CI public key 213. In this case, the certificate 251 of Object 2 with respect to the certificate 271 of Object 3 may be referred to as a "sub-certificate issuer (sub CI) certificate" or a "sub-certificate authority (sub CA) certificate".

Figure 3:
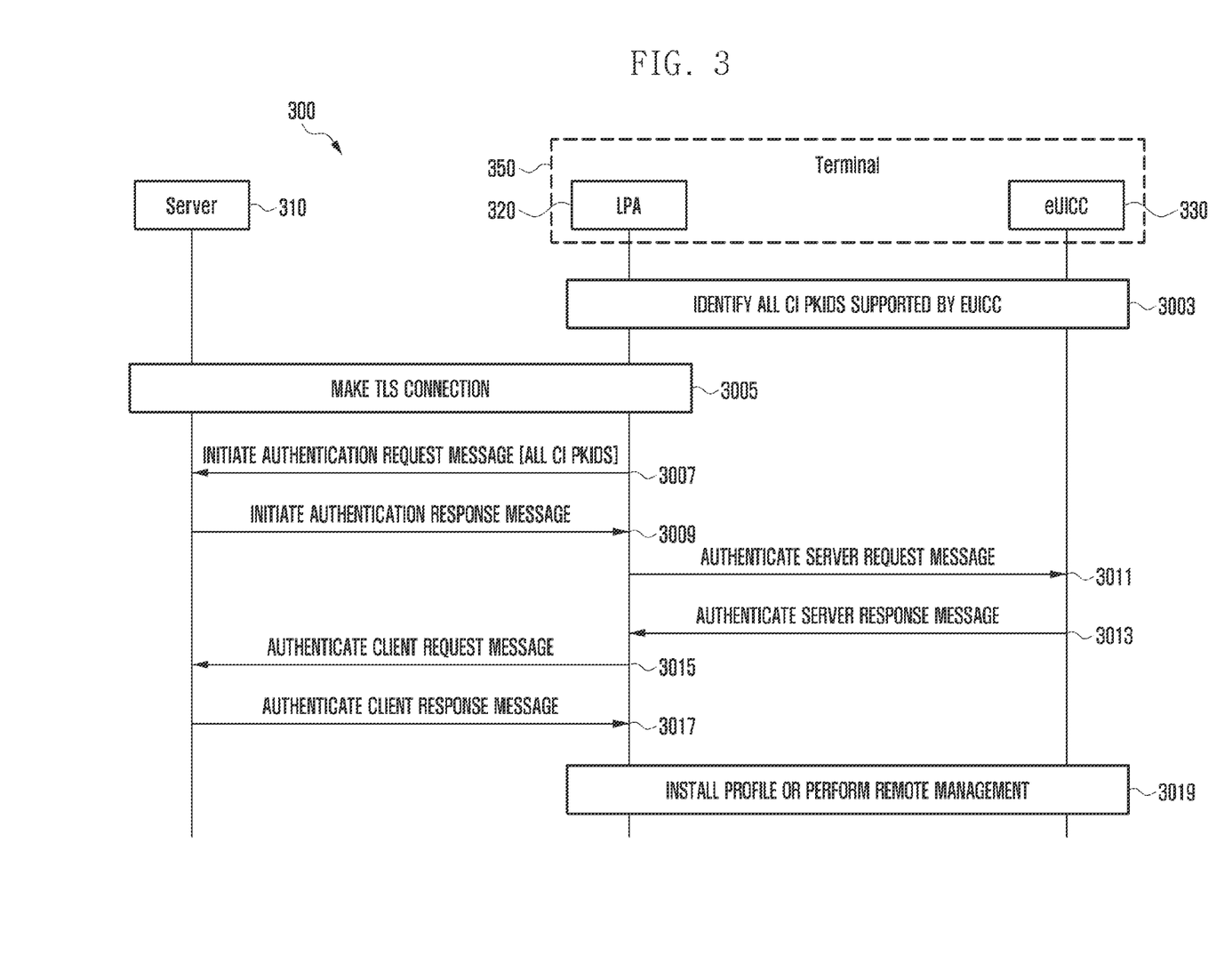
FIG. 3 is a diagram illustrating a mutual authentication procedure between a server and a terminal.

FIG. 3 is a diagram 300 illustrating a mutual authentication procedure between a server 310 and a terminal 350.

In FIG. 3, the server 310 may be, for example, a profile management server (SM-DP+) or a service discovery server (SM-DS). In addition, in FIG. 3, the terminal 350 may include software for controlling an eUICC local profile assistant (LPA)} 320 and an eUICC 330. In addition, in FIG. 3, each of the server 310, the LPA 320, and the eUICC 330 may store one or more digital certificates.

Referring to FIG. 3, the LPA 320 may check a list of all CI public keys (CI PKIDs) supported by the eUICC 330 in step 3003. More specifically, in step 3003, the LPA 320 and the eUICC 330 may identify eUICC information using an eUICC information request (Get eUICC info request) message and an eUICC information response (Get eUICC info response) message. The eUICC information response message may include eUICC information, which is referred to as "euiccinfo1", "euiccInfo", or the like. The eUICC information may include a list of all CI PKIDs supported by the eUICC 330.

In step 3005, the LPA 320 and the server 310 may estimate a TLS connection. The TLS connection in step 3005 may be performed using a server authentication method, among TLS connection methods, in which the LPA 320 verifies the identity of the server 310. When the LPA 320 identifies the identity of the server 310 during the TLS connection in step 3005, the server 310 may submit a TLS certificate to the LPA 320. The LPA 320 or the terminal 350 may store one or more CI PKIDs for validating the TLS certificate. If one or more sub-CI certificates are required for validating the TLS certificate of the server 310 using the CI PKID, the server 310 may submit one or more sub-CI certificates to the LPA 320 together with the TLS certificate in step 3005. After the TLS connection is established, all messages between the LPA 320 and the server 310 may be protected by the TLS security procedure.

In operation 3007, the LPA 320 may make a request to the server 310 for initiating mutual authentication. The initiation of mutual authentication may be performed using an initiate authentication request message. The initiate authentication request message in step 3007 may include all CI PKIDs supported by the eUICC 330, based on the information (euiccInfo1) of the eUICC 330 identified by the LPA 320 in step 3003.

In operation 3009, the server 310 may respond to the LPA 320 with initiation of the mutual authentication. The mutual authentication response may use an initiate authentication response message. The initiate authentication response message in step 3009 may include one CI PKID selected from the list of CI PKIDs included in the information (euiccinfo1) of the eUICC 330 received by the server 310 in step 3007, a server certificate capable of verifying the validity using the corresponding CI PKID; and a digital signature of the server 310 capable of verifying the validity using the corresponding server certificate. In this case, the CI PKID selected by the server 310 may be referred to as an "eUICC CI PKID to be used by the eUICC". In addition, if one or more sub-CI certificates are required to determine validity of the server 310 using the selected CI PKID, the initiate authentication response message in step 3009 may include one or more sub-CI certificates together with the server certificate. The certificate of the server 310 transmitted in step 3007 may be different from the TLS certificate of the server 310 transmitted in step 3005. In addition, the CI that issues the certificate of the server 310 transmitted in step 3007 and the CI that issues the TLS certificate of the server 310 transmitted in step 3005 may be the same or different.

In operation 3011, the LPA 320 may make a request to the eUICC 330 for authentication of the server. The authentication request may be performed using an authenticate server request message. The authenticate server request message in step 3011, like the message received by the LPA 320 in step 3009, may include a CI PKID that the server selects and transmits, a server certificate capable of verifying the validity using the corresponding CI PKID, one or more sub-CI certificates necessary for the verification of the validity, and a digital signature of the server 310 capable of verifying the validity using the server certificate. In addition, the authenticate server request message in step 3011 is information additionally produced by the LPA 320, and may include information about the operation type that the terminal intends to perform.

In step 3013, the eUICC 330 may transmit a server authentication result to the LPA 320 in reply. The authentication result may be transmitted using an authenticate server response message. The authenticate server response message in step 3013 may include a validity, verification result with respect to the digital signature of the server 310 received by the eUICC 320 in step 3011, a CI PKID that the server 310 selects and transmits, an eUICC certificate capable of verifying the validity using the corresponding CI MOD, one or more sub-CI certificates necessary for the verification of the validity, a digital signature of the eUICC 330 capable of verifying the validity using the &ACC certificate, and information about the operation type that the terminal intends to perform.

In operation 3015, the LPA 320 may make a request to the server 310 for authentication of the terminal. The authentication request of the terminal may be performed using an authenticate client request message. The authenticate client request message in step 3015 may include information received by the LPA 320 from the eUICC 330 in step 3013.

In operation 3017, the server 310 may transmit an authentication result of the terminal in reply. The authentication result may be transmitted using an authenticate client response message. The authenticate client response message in step 3017 may include a validity verification result with respect to the digital signature of the eUICC 330 received by the server 310 in step 3015 and the information on an event or event summary corresponding to the operation type to be performed by the terminal 350.

In step 3019 the terminal 350 may install a profile or perform remote management of a profile according to the content of the event received in step 3017.

According to the mutual authentication procedure between the server 310 and the terminal 350 shown in FIG. 3, since the terminal 350 verifies the server certificate using all CI PKIDs pre-stored in the eUICC 330, it is difficult to limit a connection to the server 310 having a server certificate belonging to a certificate hierarchy of a specific CI certificate.

Figure 4:
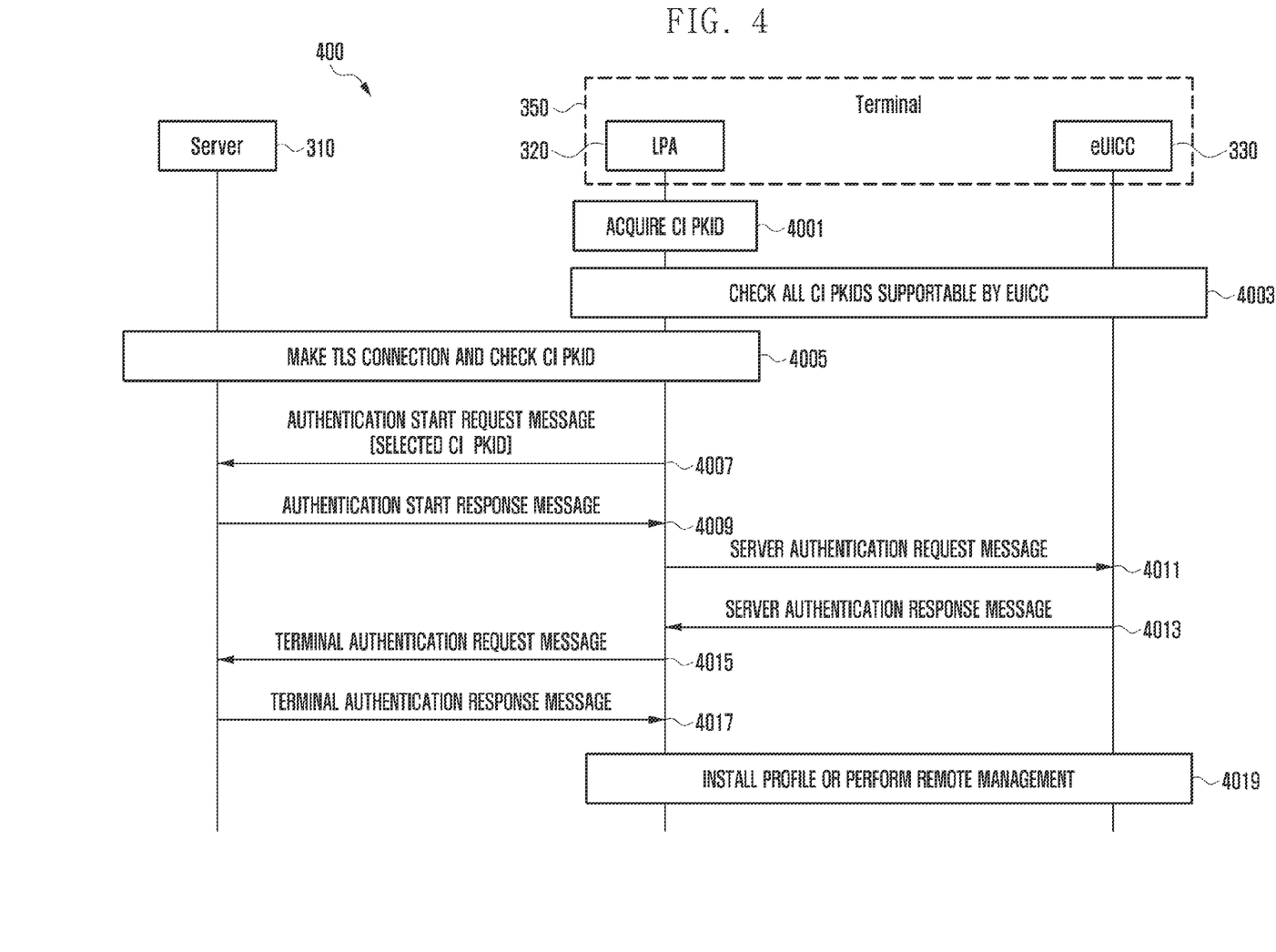
FIG. 4 is a diagram illustrating a procedure of discussing a certificate to be used during a mutual authentication procedure between a server and a terminal according to an embodiment.

FIG. 4 is a diagram 400 illustrating a procedure of identifying a server 310 having a server certificate belonging to a certificate hierarchy of a specific CI certificate when performing mutual authentication between the server 310 and a terminal 350 according to an embodiment of the disclosure.

In FIG. 4, a description of the server 310, the LPA 320, the eUICC 330, and the terminal 350 refers to the description made with reference to FIG. 3.

Referring to FIG. 4, as a method for restricting the certificate of the server 310 to the certificate belonging to a certificate hierarchy of a specific CI certificate when performing mutual authentication later, the LPA 320 may acquire public key identifier (CI PIM) information of the corresponding CI certificate in step 4001, The LPA 320 may acquire the corresponding CI PKID information by the following methods, but the method is not necessarily limited thereto.

Figure 5:
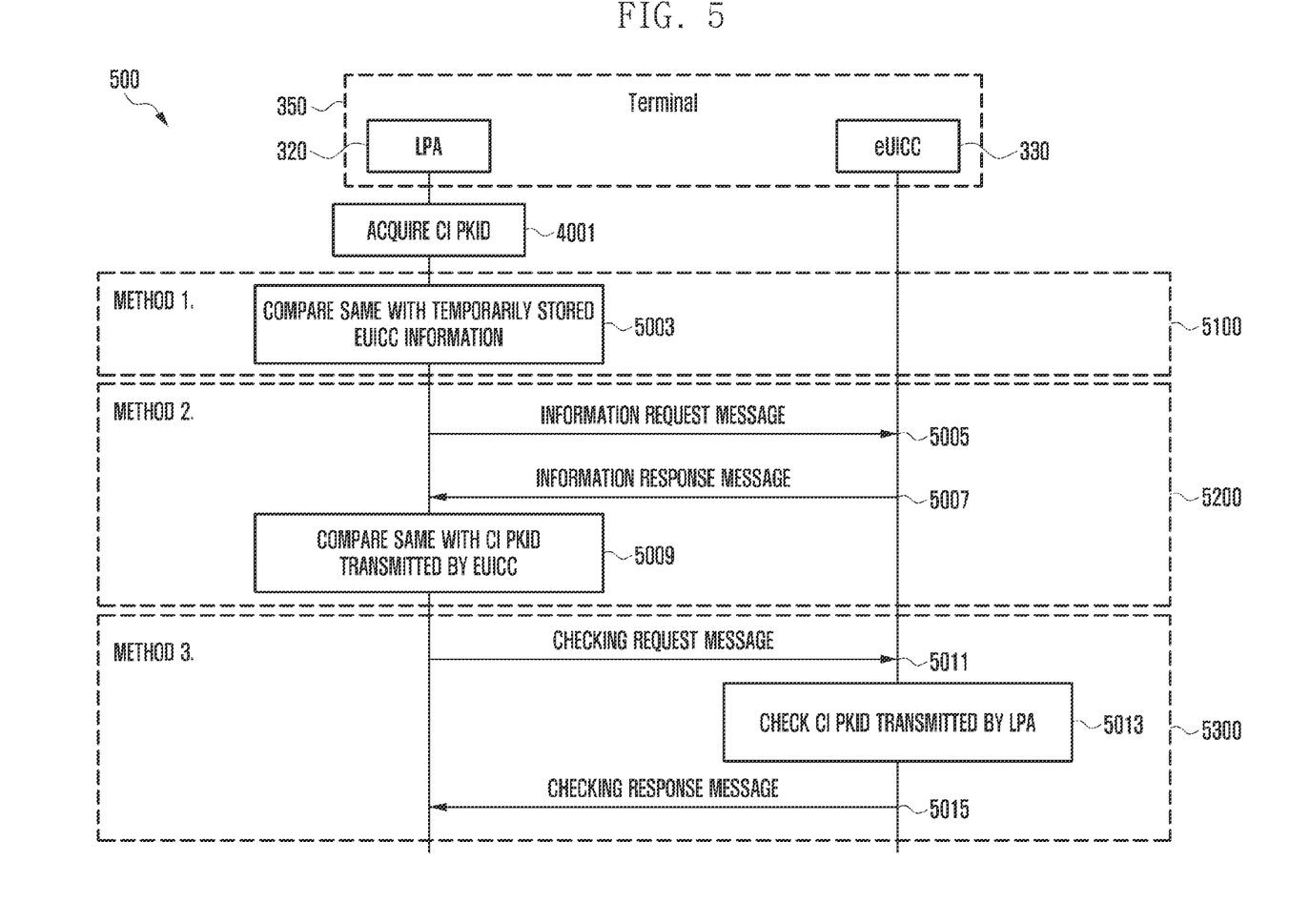
FIG. 5 is a diagram illustrating a procedure for selecting a certificate to be suggested by a terminal to be used for a mutual authentication procedure to a server according to an embodiment.

Direct user input to terminal
    Retrieve some data of eUICC storage space
    Retrieve profile installed in eUICC
    Retrieve activation code used in installation of profile
    Transfer by 3rd party software to LPA in command code form
    Transfer by specific server relaying profile installation or remote management to LPA
    Transfer by server managing terminal, LPA, eUICC to LISA In step 4003, the LPA 320 may check whether or not the eUICC 330 is able to support the corresponding CI PKID in relation to the CI PKID information acquired in step 4001. The operation of the terminal 350 in step 4003 will be described in more detail with reference to FIG.

In operation 4005, the LPA 320 and the server 310 may perform a TLS connection. The TLS connection in step 4005 may be performed using a server authentication method in which the LPA 320 identifies the identity of the server 310, among TLS connection methods. When the LPA 320 identifies the identity of the server 310 in the TLS connection process in step 4005, the server 310 may submit a TLS certificate to the LPA 320, The 320 or the terminal 350 may include one or more CI PKIDs for verifying the validity of the TLS certificate. If one or more sub-CI certificates are required for verifying the validity of the TLS certificate of the server 310 using the CI PKID, the server 310 may submit one or more sub-CI certificates to the LPA 320 together with the TLS certificate in step 4005. In step 4005, compared with step 3005 described in FIG. 3, the terminal 350 may further check whether or not it is possible to verify the certificate of the TLS certificate and the sub-CI certificates, which are submitted by the server, using the CI PKID identified in step 4001. After the TLS connection is established, all messages between the LPA 320 and the server 310 may be protected by the TLS security procedure.

In operation 4007, the LPA 320 may make a request to the server 310 for initiating mutual authentication. The initiation of mutual authentication may be performed using an initiate authentication request message. The initiate authentication request message in step 4007, compared with step 3007 described in FIG. 3, may include a CI PKID that the LPA 320 acquires in step 4001. In addition, the initiate authentication request message in step 4007, compared with step 3007 described in FIG. 3, may include a CI PKID that is identified to be supported by the eUICC through the eUICC in step 4003.

In operation 4009, the server 310 may respond to the LPA 320 with initiation of mutual authentication. The mutual authentication response may be performed using an initiate authentication response message. The initiate authentication response message in step 4009 may include the CI PKID received by the server 310 in step 4007, a server certificate capable of verifying the validity using the corresponding CI PKID, and a digital signature of the server 310 capable of verifying the validity using the corresponding server certificate. In this case, the transmitted CI MID may be referred to as an "eUICC CI PKID to be used by the eUICC". In addition, if one or more sub-CI certificates are required to determine the validity of the server 310 using the corresponding CI PKID, the initiate authentication response message in step 4009 may include one or more sub-CI certificates together with the server certificate. The certificate of the server 310 transmitted in step 4009 may be different from the TLS certificate of the server 310 transmitted in step 4005. In addition, the CI that issues the certificate of the server 310 transmitted in step 4009 and the CI that issues the TLS certificate of the server 310 transmitted in step 4005 may be the same or different. In addition, the LPA 320 may compare the CI PKID transmitted by the server 310 in step 4009 with the CI PKID transmitted by the LPA 320 in step 4007. If the CI PKID transmitted by the server 310 is different from the CI MD transmitted by the LPA 320 in step 4007, the LPA 320 may terminate the communication.

In operation 4011, the LPA 320 may make a request to the eUICC 330 for authentication of the server. The authentication request may be performed using an authenticate server request message. The authenticate server request message in step 4011, like the message received by the LPA. 320 in step 4009, may include a CI PKID transmitted by the server 310, a server certificate capable of verifying the validity using the corresponding CI PKID, one or more sub-CI certificates necessary for the verification of the validity, and a digital signature of the server 310 capable of verifying the validity using the server certificate. In addition, the authenticate server request message in step 4011 is information additionally produced by the LPA 320, and may include information about the operation type that the terminal intends to perform. The eUICC 330 that has received the message in step 4011 may verify the validity of the certificates included in the message in step 4011, and may verify the digital signature of the server 310 using the corresponding certificates. In this case, the eUICC 330 may further check whether or not the eUICC 330 is able to support the CI PKID included in the message in step 4011 and/or whether or not the CI PKID is available. If the CI PKID transmitted by the server 310 cannot be supported or if the CI PKID is not available, the eUICC 330 may terminate the communication.

In step 4013, the eUICC 330 may transmit a server authentication result to the LPA 320 in reply. The authentication result may be transmitted using an authenticate server response message. The authenticate server response message in step 4013 may include the validity verification result with respect to the digital signature of the server 310 received by the eUICC 320 in step 4011, a CI PKI) transmitted by the server 310, an eUICC certificate capable of verifying the validity using the corresponding CI PKID, one or more sub-CI certificates necessary for the verification of the validity, a digital signature of the eUICC 330 capable of verifying the validity using the eUICC certificate, and information about the operation type that the terminal intends to perform.

A description of the subsequent operations in steps 4015 to 4019 refers to the description of the operations in steps 3015 to 3019 in FIG. 3.

According to the mutual authentication procedure between the server 310 and the terminal 350 shown in FIG. 4, since the terminal 350 verifies the server certificate using a specific CI PKID input in step 4001, it is possible to limit a connection to the server 310 having a server certificate belonging to a certificate hierarchy of a specific CI certificate.

FIG. 5 is a diagram 500 illustrating the operations of the LPA 320 and the eUICC 330 in detail in relation to the operation in step 4003 described in FIG. 4.

In FIG. 5, a description of the LPA 320, the eUICC 330, and the terminal 350 refers to the description made with reference to FIG. 3.

Referring to FIG. 5, the LPA 320 may acquire CI PKID information as in step 4001 of FIG. 4. A detailed description of step 4001 refers to the description made with reference to FIG. 4. Thereafter, the terminal 350 may check whether or not the eUICC 330 is able to support the corresponding CI PKID in the following manner.

As an example 5100, the LPA 320 may compare the CI information acquired in step 4001 with eUICC information (euiccInfol or euiccInfo) temporarily cached in the LPA 320 in step 5003. More specifically, in the case where the LPA 320 caches the eUICC information (euiccInfol or euiccInfo) identified by the method as described in step 3003 of FIG. 3 in a temporary storage before step 4001, the LPA 320 may compare a list of all CI PKIDs supported by the eUICC, which are included in the temporary storage, with the CI PKID information acquired in step 4001. As a result of the comparison, if it is determined that the eUICC 330 does not support the CI PKID acquired in step 4001, the LPA 320 may terminate communication.

As another example 5200, in steps 5005 to 5009, the 320 may transmit a message to the eUICC (330) to identify a list of CI PKIDs supported by the eUICC (330), and may compare the same with the CI PKID in step 4001. More specifically, the LPA 320 may transmit an information request message to the eUICC 330 in step 5005 after step 4001. The message in step 5005 may be referred to as a "Get eUICC info request message", a "Get eUICC challenge request message", an "authenticate server request message", or the like. In addition, the message in step 5005 may include an identifier of the profile (a profile ID, an ICCID, or an AID) to be the target of the remote profile management in the future. In step 5007, the eUICC 330 may retrieve CI PKID information from the profile corresponding to the profile identifier received in step 5005, or may acquire all CI PKID information supported by the eUICC 330, thereby transmitting, to the LPA 320, the corresponding CI PKID information together with the eUICC information (euiccInfol or euiccInfo). The message in step 5007 may be referred to as a "Get eUICC info response message", a "Get eUICC challenge response message", or an "authenticate server response message". Thereafter, in step 5009, the LPA 320 may compare the response of the eUICC; 330 received in step 5007 with the CI PKID acquired in step 4001. As a result of the comparison, if it is determined that the eUICC 330 does not support the CI PKID acquired in step 4001, the LPA 320 may terminate communication.

As another example 5300, in steps 5011 to 5015, the LPA 320 may transmit a message to the eUICC 330, thereby making a request for checking whether or not the eUICC 330 supports the CI PMI) in step 4001. More specifically, the LPA 320 may transmit a checking request message to the eUICC 330 in step 5011 after step 4001. The message in step 5011 may be referred to as a "Get eUICC info request message", a "Get eUICC challenge request message", or an "authenticate server request message". In addition, the message in step 5011 may include the CI PKID information in step 4001 for making a request for checking whether or not the eUICC 330 supports, and may further include an identifier of the profile (a profile ID, an ICCID, or an AID) to be the target of the remote profile management in the future. In this regard, in step 5013, the eUICC 330 may compare the CI MID information in step 4001, which is received in step 5011, with a list of CI PKIDs supported by the eUICC 330, or may compare CI PKID information retrieved from the profile corresponding to the corresponding profile identifier received in step 5011 with a list of CI PKIDs supported by the eUICC 330, thereby identifying whether or not the eUICC 330 supports the corresponding CI HUD. If the eUICC does not support the corresponding CI PKID, the eUICC 330 may transmit a specific error code in reply, and may terminate communication. In step S015, the eUICC 330 may transmit, to the 320, a checking response message including at least one of information on whether or not the corresponding CI PKID is supported, the corresponding CI PKID information, eUICC information (euiccInfol or euiccInfo), and an eUICC random challenge. The message in step S015 may be referred to as a "Get eUICC info response message", a "Get eUICC challenge response message", or an "authenticate server response message". If the eUICC 330 transmits an error code indicating that the CI PKID is not supported in reply, the LPA 320 may terminate the communication.

Figure 6:
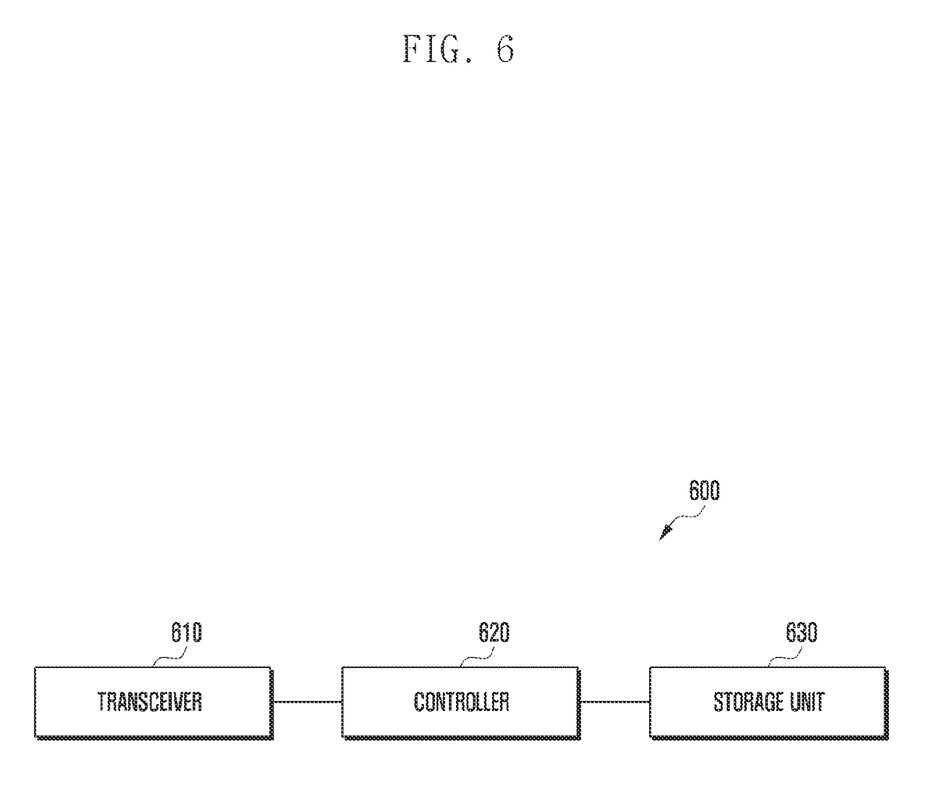
FIG. 6 is a diagram illustrating the structure of a terminal according to an embodiment of the disclosure.

FIG. 6 is a diagram illustrating the structure 600 of a terminal according to an embodiment of the disclosure.

Referring to FIG. 6, the terminal may include a transceiver 610, a controller 620, and a storage unit 630. In the disclosure, the controller may be defined as a circuit, an application-specific integrated circuit, or at least one processor. In addition, although not shown explicitly in FIG. 6, the terminal may further include an eUICC, and the eUICC may be inserted into or embedded in the terminal.

The transceiver 610 may transmit and receive signals to and from other network entities. For example, the transceiver 610 may transmit, to the profile management server, digital certificate issuer information trusted by the terminal and a random character string (nonce or random challenge) that the profile management server (SM-DP+) uses when producing a signature for self-authentication, or may receive, from the profile management server, a signature of the profile management server, one or more digital certificates to be used to verify the signature of the profile management server, and a random character string that the eUICC in the terminal uses when producing a signature for self-authentication.

In addition, the transceiver 610 may transmit a signature of the eUICC and one or more digital certificates to be used to verify the signature of the eUICC. In addition, the transceiver 610 may further transmit information on the operation type that the terminal intends to perform to the profile management server, or may receive some or all of information on an operation to be performed by the terminal from the profile management server. However, the transceiver 610 may selectively transmit information on the operation type that the terminal intends to perform.

The controller 620 may control the overall operation of the terminal according to the embodiment proposed by the disclosure. For example, the controller 620 may control signal flow between blocks so as to perform the operations according to the flowcharts described above.

More specifically, the controller 620 may identify digital certificate issuer information to be trusted by the terminal with reference to the eUICC in the terminal, may verify the validity of a digital certificate and digital certificate issuer information transmitted by the profile management server, may identify a signature of the profile management server, and may produce a signature of the eUICC. In addition, the controller 620 may perform an operation of installing or managing a profile according to the information received from the profile management server.

In addition, the controller 620 may control the operation of the transceiver or the storage unit.

The storage unit 630 may store at least one piece of information transmitted and received through the transceiver 610 and information produced through the controller 620.

In addition, the terminal of the disclosure may further include an input unit for receiving digital certificate issuer information to be trusted by the terminal. However, in the case where the input unit is not provided, the terminal may receive the digital certificate issuer information from a server or a network, may refer to information pre-stored in the terminal, or may receive the digital certificate issuer information from a third-party software in the terminal. In the case of receiving the digital certificate issuer information from the third-party software, the third-party software may pre-store digital certificate issuer information to be trusted by the terminal, or may receive the same from a server or a network.

Figure 7:
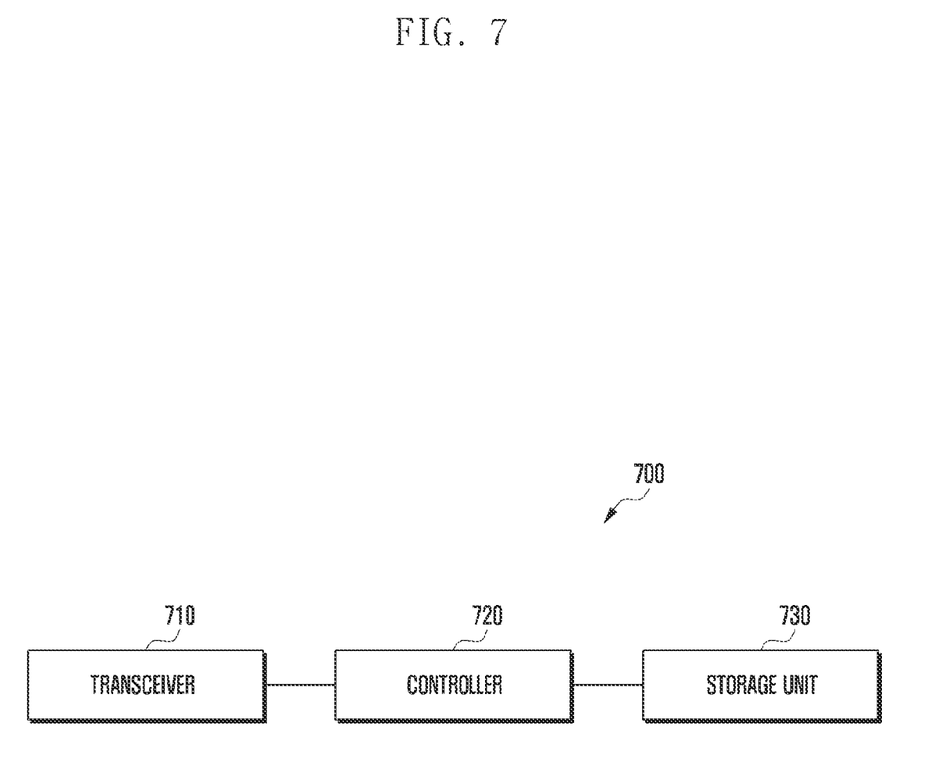
FIG. 7 is a diagram illustrating the structure of a server according to an embodiment of the disclosure.

FIG. 7 is a diagram illustrating the structure 700 of a server according to an embodiment of the disclosure.

Referring to FIG. 7, the server may include a transceiver 710, a controller 720, and a, storage unit 730. In the disclosure, the controller may be defined as a circuit, an application-specific integrated circuit, or at least one processor.

The transceiver 710 may transmit and receive signals to and from other network entities. For example, the transceiver 710 may receive, from a terminal, digital certificate issuer information trusted by the terminal and a random character string (nonce or random challenge) that the profile management server uses when producing a signature for self-authentication.

In addition, the transceiver 710 may transmit, to the terminal, a signature of the profile management server, one or more digital certificates to be used to verify the signature of the profile management server, and a random character string that the eUICC in the terminal uses when producing a signature for self-authentication, and may receive a signature of the eUICC and one or more digital certificates to be used to verify the signature of the eUICC. In addition, the transceiver 710 may further receive information on the operation type that the terminal intends to perform from the terminal. However, the information on the operation type that the terminal intends to perform may be selectively transmitted.

In addition, the transceiver 710 may transmit, to the terminal, some of all of information on the operation to be performed by the terminal.

The controller 720 may control the overall operation of the terminal according to the embodiment proposed by the disclosure. For example, the controller 720 may control a signal flow between blocks so as to perform the operations according to the flowcharts described above.

More specifically, the controller 720 may verify whether or not digital certificate issuer information trusted by the terminal is valid, may determine whether or not the server is also able to trust the digital certificate issuer trusted by the terminal, may select a digital certificate corresponding to digital certificate issuer information trusted by the terminal, and may produce a signature of the profile management server.

In addition, the controller 720 may verify the validity of a digital certificate transmitted by the terminal, may identify a signature of the eUICC, and may determine the operation type to be performed by the terminal.

In addition, the controller 720 may control the operation of the transceiver or the storage unit.

The storage unit 730 may store at least one piece of information transmitted and received through the transceiver 710 and information produced through the controller 720.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

What is claimed:

1. A method performed by a terminal including a universal integrated circuit card (UICC) in a wireless communication system, the method comprising:
   identifying a first certificate issuer (CI) public key identifier;
   obtaining, from the UICC, UICC information including a first list of a public key identifiers associated with the UICC;
   identifying a second list based on the first list of the public key identifiers associated with the UICC, wherein the second list comprises at least one public key identifier except a public key identifier that does not match the first CI public key identifier in the first list of the public key identifiers associated with the UICC; and
   transmitting, to a server, a first message for initiating an authentication, the first message including the second list.

2. The method of claim 1, wherein identifying the second list comprises:
   comparing the first CI public key identifier with the first list of the public key identifiers associated with the UICC included in the UICC information,
   wherein a public key identifier used in an authentication procedure is restricted to the first CI public key identifier.

3. The method of claim 1, wherein the first CI public key identifier is identified based on at least one of receiving a user input with respect to the terminal, retrieving information stored in the UICC, receiving an activation code, or receiving a command code.

4. The method of claim 1, further comprising:
   receiving, from the server, a second message after transmitting the first message,
   wherein the second message includes a second CI public key identifier associated with the UICC, a server certificate, and a server signature,
   wherein the second CI public key identifier is determined based on the first message, and
   wherein a validity of the server for the authentication is verified based on the server certificate and the server signature.

5. The method of claim 1, further comprising:
   stopping an authentication procedure, in case that there is no public key identifier matched with the first CI public key identifier in the first list of the public key identifiers associated with the UICC.

6. A terminal in a wireless communication system, the terminal comprising:
   a transceiver configured to transmit and receive a signal;
   a universal integrated circuit card (UICC); and
   a controller coupled with the transceiver and configured to:
      identify a first certificate issuer (CI) public key identifier,
      obtain, from the UICC, UICC information including a first list of public key identifiers associated with the UICC,
      identify a second list based on the first list of the public key identifiers associated with the UICC, wherein the second list comprises at least one public key identifier except a public key identifier that does not match the first CI public key identifier in the first list of the public key identifiers associated with the UICC, and
      transmit, to a server, a first message for initiating an authentication, the first message including the second list.

7. The terminal of claim 6, wherein the controller is further configured to compare the first CI public key identifier with the first list of the public key identifiers associated with the UICC included in the UICC information, and
   wherein a public key identifier used in an authentication procedure is restricted to the first CI public key identifier.

8. The terminal of claim 6, wherein the first CI public key identifier is identified based on at least one of receiving a user input with respect to the terminal, retrieving information stored in the UICC, receiving an activation code, or receiving a command code.

9. The terminal of claim 6, wherein the controller is configured to receive, from the server, a second message after transmitting to the first message,
   wherein the second message includes a second CI public key identifier associated with the UICC, a server certificate, and a server signature,
   wherein the second CI public key identifier is determined based on the first message, and
   wherein a validity of the server for the authentication is verified based on the server certificate and the server.

10. The terminal of claim 6, wherein the controller is configured to stop an authentication procedure, in case that there is no public key identifier matched with the first CI public key identifier in the first list of the public key identifiers supported by the UICC.

11. A method performed by a server in a wireless communication system, the method comprising:
    receiving, from a terminal, a first message for initiating an authentication of the terminal, the first message including a first list of public key identifiers matching a first certificate issuer (CI) public key identifier; and
    transmitting, to the terminal, a second message after receiving the first message, the second message including a second CI public key identifier associated with a universal integrated circuit card (UICC),
    wherein the first list comprises at least one public key identifier except a public key identifier that does not match the first CI public key identifier in a second list of the public key identifiers associated with the UICC.

12. The method of claim 11, wherein the first list is identified by the terminal by comparing the first CI public key identifier with the second list of public key identifiers associated with the UICC of the terminal included in UICC information cached in the terminal, and
    wherein a public key identifier used in an authentication procedure is restricted to the first CI public key identifier.

13. The method of claim 11, wherein the first CI public key identifier is identified based on at least one of receiving a user input with respect to the terminal, retrieving information stored in the UICC, receiving an activation code, or receiving a command code.

14. The method of claim 11, wherein the second message further includes a server certificate and a server signature,
wherein the second CI public key identifier is determined based on the first message, and
wherein a validity of the server for the authentication is verified based on the server certificate and the server signature.

15. A server in a wireless communication system, the server comprising:
a transceiver configured to transmit and receive a signal; and
a controller coupled with the transceiver and configured to:
receive, from a terminal, a first message for initiating an authentication of the terminal, the first message including a first list of public key identifiers matching a first certificate issuer (CI) public key identifier, and
transmit, to the terminal, a second message after receiving the first message, the second message including a second CI public key identifier associated with a universal integrated circuit card (UICC),
wherein the first list comprises at least one public key identifier except a public key identifier that does not match the first CI public key identifier in a second list of the public key identifiers associated with the UICC.

16. The server of claim 15, wherein the first list is identified by the terminal by comparing the first CI public key identifier with the second list of public key identifiers associated with the UICC of the terminal included in UICC information cached in the terminal, and
wherein a public key identifier used in an authentication procedure is restricted to the first CI public key identifier.

17. The server of claim 15, wherein the first CI public key identifier is identified based on at least one of receiving a user input with respect to the terminal, retrieving information stored in the UICC, receiving an activation code, or receiving a command code.

18. The server of claim 15, wherein the second message further includes a server certificate and a server signature,
wherein the second CI public key identifier is determined based on the first message, and
wherein a validity of the server for the authentication is verified based on the server certificate and the server signature.

* * * * *